United States Patent [19]

Marrocco, III

[11] Patent Number: 5,807,960
[45] Date of Patent: Sep. 15, 1998

[54] ALKYL PHOSPHATE CATALYST FOR POLYQUINOLINE SYNTHESIS

[75] Inventor: Matthew L. Marrocco, III, Santa Ana, Calif.

[73] Assignee: Hitachi Chemical Co., Ltd., Tokyo, Japan

[21] Appl. No.: 845,901

[22] Filed: Apr. 28, 1997

[51] Int. Cl.⁶ .............................. C08G 8/02; C08G 14/00; C08G 12/00
[52] U.S. Cl. .................... 528/125; 528/126; 528/127; 528/128; 528/167; 528/168; 528/183; 528/223; 528/229
[58] Field of Search ................... 528/125, 126, 528/127, 128, 167, 168, 183, 223, 229

[56] References Cited

U.S. PATENT DOCUMENTS

| | | | |
|---|---|---|---|
| 4,000,187 | 12/1976 | Stille | 528/129 |
| 4,507,462 | 3/1985 | Stille | 528/125 |
| 5,017,677 | 5/1991 | Stille | 528/125 |
| 5,247,050 | 9/1993 | Hendricks | 528/127 |
| 5,648,448 | 7/1997 | Marrocco, III et al. | 528/126 |

FOREIGN PATENT DOCUMENTS 9404592  3/1994  WIPO.

OTHER PUBLICATIONS

Journal, "Polyquinolines", Stille, Apr. 1987.

*Primary Examiner*—Randy Gulakowski
*Attorney, Agent, or Firm*—Antonelli, Terry, Stout & Kraus, LLP

[57] ABSTRACT

A method is provided for the preparation of polyquinoline polymers based on Friedlander condensation polymerization. The method comprises mixing monomers which, when polymerized, form a polyquinoline polymer, together with a catalyst and a solvent, wherein the catalyst comprises an alkyl phosphate.

23 Claims, No Drawings

ALKYL PHOSPHATE CATALYST FOR POLYQUINOLINE SYNTHESIS

FIELD OF THE INVENTION

This invention relates to catalyst solvent systems for use in Friedlander condensation polymerization reactions for forming polyquinolines.

BACKGROUND OF THE INVENTION

Polyquinoline polymers were first developed by John K. Stille, whose research group demonstrated the synthesis of dozens of polyquinoline derivatives.

Polyquinolines having excellent thermal stability and good mechanical properties are disclosed in U.S. Pat. Nos. 4,000,187 and 5,017,677, both to Stille, U.S. Pat. No. 5,247,050 to Henricks, and in J. K. Stille, *Macromolecules*, 1981, 14, 870–880 ("Stille article"), all of which are incorporated herein by reference.

U.S. Pat. No. 4,000,187 describes the preparation of polyquinoline homopolymers by the Friedlander condensation polymerization reaction of what are commonly referred to as "type AA" and "type BB" monomers. Type AA monomers are aromatic amino carbonyl monomers containing two sets of ortho-amino carbonyl functions attached to an aromatic nucleus. Particularly useful type AA monomers are selected from the group consisting of compounds represented by the formulas:

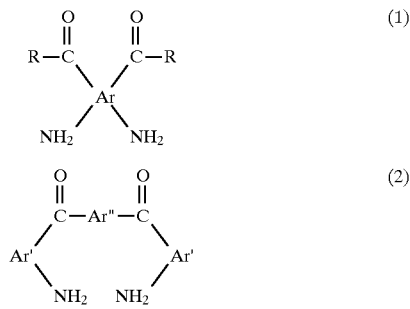

wherein R is hydrogen or an aryl, Ar is a tetravalent aromatic group in which the positions of attachment of each set of carbonyl and amino functions are ortho, Ar' is a divalent aromatic group in which the positions of attachment of the carbonyl and amino functions are ortho, Ar" is a divalent aromatic group. As described in U.S. Pat. No. 5,017,677, the Ar substituent of the general formulas (1) and (2) for the type AA compounds can be any aromatic nucleus in which the positions of attachment of each set of carbonyl and amino functions are ortho, including a single aromatic nucleus and a polycyclic aromatic nucleus.

The Ar substituent can be any tetravalent aromatic group in which the positions of attachment of each set of carbonyl and amino functions are ortho, including a single aromatic nucleus, a polycyclic aromatic nucleus and a polynuclear aromatic group. Examples of the Ar substituent include, but are not limited to, tetravalent aromatic groups of 6 to 26 carbon atoms, such as the following groups:

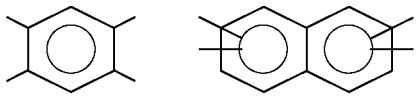

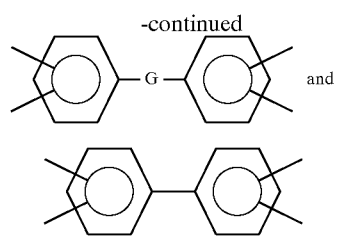

When the R substituent of the type AA compounds defined by the general formula (1) is aryl, Ar is most commonly tetravalent phenyl (ph).

The substituent Ar' is any divalent aromatic group in which the positions of attachment of the carbonyl and amino functions are ortho. Examples of the substituent Ar' include, but are not limited to, divalent aromatic groups of 6 to 12 carbon atoms, such as the following groups:

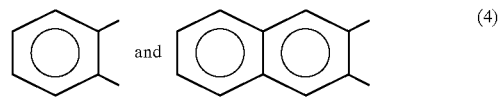

The substituent Ar" in the general formula (2) for the type AA compounds may be any divalent aromatic group, such as a divalent aromatic group of 5 to 26 carbon atoms, and one or more carbons on the aromatic nuclei may be substituted by other atoms, such as N. Examples of the Ar" substituent include, but are not limited to, the following groups:

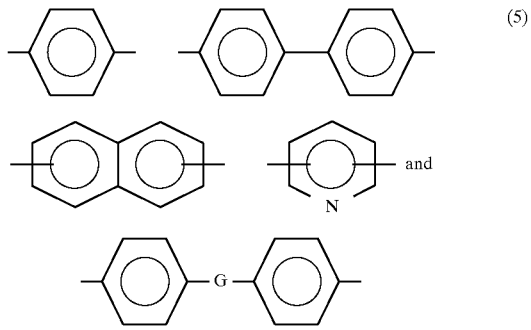

The symbol G represents a divalent group selected from the group consisting of an alkylene, such as an alkylene of 1 to 12 carbon atoms, an arylene, such as an arylene of 6 to 12 carbon atoms, an aralkylene, such as an aralkylene of 7 to 14 carbon atoms, an alkarylene, such as an alkarylene of 7 to 10 carbons, an alkylenedioxy, such as an alkylenedioxy of 1 to 12 carbon atoms, an arylenedioxy, such as an arylenedioxy of 6 to 12 carbon atoms, —O—, —CO—, —S—, —SO—, —SO$_2$—, a dialkylsilicon group, such as a dialkylsilicon of 1 to 5 carbon atoms per alkyl group, a diarylsilicon group, such as a diarylsilicon of 6 carbon atoms per aryl group, a divalent group having the following structure:

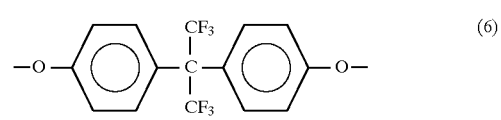

a divalent group having the following structure:

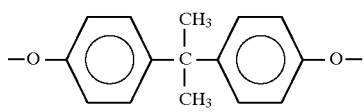

and a cardo group, such as the following groups:

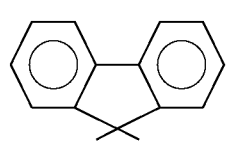 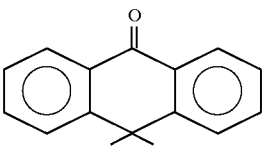 (8)

Type BB monomers are methylene ketone monomers selected from the group consisting of compounds represented by the formulas:

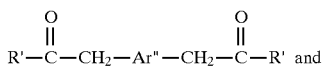 (9)

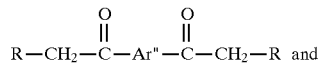 (10)

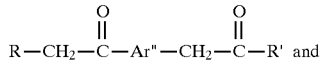 (11)

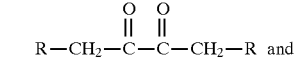 (12)

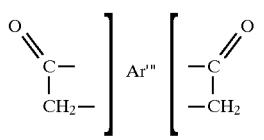 (13)

wherein R is hydrogen or a $C_6$ to $C_{12}$ aryl, including but not limited to phenyl, tolyl, naphthyl, and biphenyl, R' is a $C_6$ to $C_{12}$ aryl, including but not limited to phenyl, tolyl, naphthyl, and biphenyl, Ar" is a divalent aromatic group, and Ar'" is a tetravalent aromatic group, four positions of which are occupied by connection of the methylene carbonyl functions. The Ar" of the type BB compounds is the same as the Ar" of the type AA compounds. When the substituent R' or R of the type BB compounds is aryl, Ar" is most often phenylene.

The substituent Ar'" is a tetravalent aromatic group, such as a tetravalent aromatic group of 10 to 12 carbon atoms, and may be two divalent aromatic groups not already joined together or a single tetravalent group, e.g., a fused ring structure or bicyclic structure already joined some way. Examples of the Ar'" substituent include, but are not limited to, the following groups:

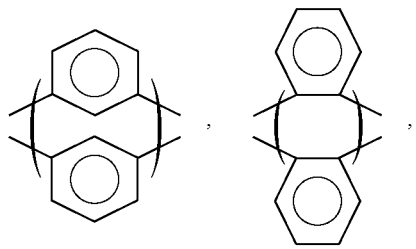 (14)

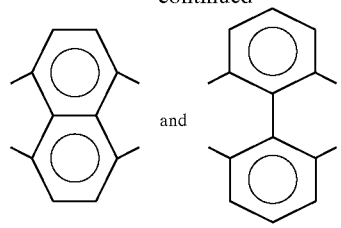

and

The Stille article reports that related polyquinoline polymers can be prepared from the reaction of monomers, referred to as "type AB" monomers, selected from the group consisting of aromatic compounds containing one set of ortho-amino carbonyl functions, as well as one methylene ketone function attached to an aromatic nucleus. Such monomers are represented by the formulas:

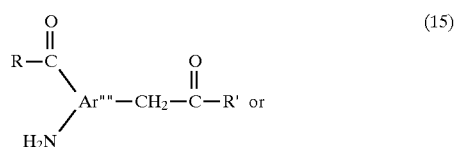 (15)

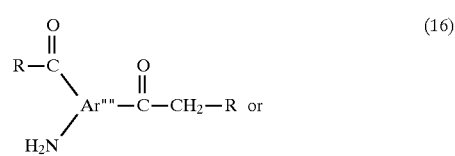 (16)

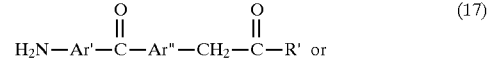 (17)

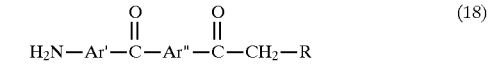 (18)

wherein R is hydrogen or an aryl, R' is an aryl, Ar' is a divalent aromatic group in which the positions of attachment of the carbonyl and amino functions are ortho, Ar" is a direct bond or a divalent aromatic group, and Ar"" is a trivalent aromatic group in which the positions of attachment of the set of carbonyl and amino functions is ortho.

The Ar' and Ar" of the type AB compounds are the same as the Ar' and Ar" described above with respect to type AA and BB compounds.

The substituent Ar"" is a trivalent aromatic group in which the positions of attachment of the set of carbonyl and amino functions is ortho. Examples of the substituent Ar"" include, but are not limited to, trivalent aromatic groups of 6 to 26 carbon atoms, such as the following groups:

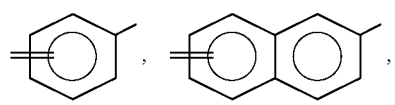 (19)

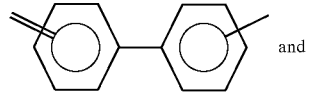

and

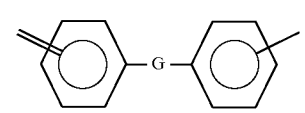

When the substituent R or R' of the AB compounds is aryl, Ar"" most often is a trivalent benzene group.

U.S. Pat No. 5,017,677 describes the preparation of a polyquinoline copolymer composition which comprises the reaction product of various mixtures of type AA, type BB and type AB monomers.

U.S. Pat. No. 5,247,050 discloses fluorinated polyquinoline polymers in which the repeating units comprise one or more quinoline groups and at least a portion of the repeating groups include a hexafluoroisopropylidene group or a 1-aryl-2,2-trifluoroethylidene group or both. Such polymers tend to be more soluble in common organic solvents, have lower dielectric constants, and lower moisture absorption yet maintain or exceed the thermal stability normally associated with prior art polyquinoline polymers.

In effecting Friedlander condensation polymerization of polyquinolines, the monomers are mixed together in a solvent in the presence of an acidic catalyst. Stille disclosed the use of polyphosphoric acid in m-cresol and mixtures of $P_2O_5$ and m-cresol as catalyst/solvent systems. Stille later found that pure diarylphosphates and cresol were much preferred, leading to higher molecular weight polyquinolines. The best catalysts were reported by Stille to be pure di-meta-cresyl phosphate or diphenylphosphate, and the best solvent was reported to be m-cresol. J. K. Stille, *Macromolecules,* 1981, 14, 870–880. Such diarylphosphates are generally not commercially available and must be prepared and purified, adding greatly to the overall cost of polyquinoline manufacture.

It would be desirable to provide a method of producing polyquinolines, particularly high molecular weight polyquinolines, by Friedlander condensation polymerization that is both efficient and less expensive than current methods.

SUMMARY OF THE INVENTION

The present invention provides a method for preparing polyquinoline polymers which eliminates the need for diarylphosphate catalysts. In accordance with the invention, polyquinoline polymers can be prepared in a Friedlander condensation polymerization by mixing monomers which, when polymerized, form the desired polyquinoline polymer together with a catalyst comprising one or more alkyl phosphates and a solvent. The mixture is heated to a temperature of preferably about 80° C. to about 120° C. for a time sufficient for the monomers to polymerize and to develop a polymer having the desired molecular weight, preferably a weight average molecular weight of at least about 1,000 and more preferably of at least about 5,000, and even more preferably at least about 10,000. For many applications, high molecular weight polyquinoline polymers, i.e., those having a weight average molecular weight of at least about 50,000 are preferred. Crystalline polymer may be recovered from the polymer dope by conventional means, e.g., the addition of ethanol or the like which is miscible with the solvent, but does not solubilize the polymer.

DETAILED DESCRIPTION OF THE INVENTION

It has been found, surprisingly, that it is not necessary to use pure diarylphosphates as catalyst for polyquinoline synthesis. Rather, polyquinolines, even high molecular weight polyquinolines, can be synthesized using mono- and/or dialkyl phosphates as catalyst. It has also been found that polyquinolines, including high molecular weight polyquinolines, may be prepared in good yield without the use of cresol as a co-solvent.

The general method of the present invention is to mix the monomer(s) together with a catalyst comprising one or more alkyl phosphates and a solvent. The monomers selected may be any suitable monomers which, when polymerized, form a polyquinoline polymer.

In the catalyst-solvent system, the amount of alkylphosphate catalyst is preferably at least 5 to 10% wt./vol. Less than about 5% wt./vol catalyst is not preferred as the reaction tends to progress too slowly. Up to 100% alkylphosphate catalyst could be used if desired as long as the monomers and resulting polymer are soluble in the pure catalyst. The presently preferred ratio of alkyl phosphate to solvent is from about 50:50 wt./vol. to about 70:30 wt./vol.

The amount of alkylphosphate catalyst is not critical as long as there is a stoichiometric excess of catalyst. The amount of catalyst selected is preferably an amount which, in combination with the solvent, provides a usable viscosity. Preferably, the weight amount of catalyst is from about 1 to about 10 times the weight of the monomers and more preferably from about 2 to about 5 times the weight of the monomers. Preferably the weight amount of the solvent is from about 0.5 to 50 and more preferably from about 1 to 5 times the weight of the monomers.

The polyquinoline polymer is recovered by first coagulating the polymer-catalyst-solvent mixture by pouring the mixture into a solution of 10% triethanolamine in anhydrous alcohol. The polymer solids were then extracted in a continuous extractor with 10% triethanolamine/anhydrous alcohol for three days.

The mixture of monomers, catalyst and solvent is heated under inert atmosphere to between about 50° C. and 150° C., preferably between 80° C. and 120° C., and most preferably between 90° C. and 110° C., until the desired molecular weight, e.g., as determined by viscosity has been attained, or for a predetermined length of time. The temperature should not exceed 150° C., preferably 120° C., and most preferably 110° C. in order to avoid or at least minimize thermal decomposition of the alkyl phosphate.

Polyquinoline having a weight average molecular weight within the range of from about 1,000 to about 500,000, as measured by size exclusion chromatography using polystyrene standards, are presently preferred. Polymers in this molecular weight range are suitable for film formation and other processing. The particular molecular weight will determine the solution viscosity at a given percent solids and therefore the thickness and properties of the cast film.

Water of condensation should be removed as it forms. Water may be removed by azeotropic distillation, by distillation of solvent through a drying agent such as molecular sieves, or by other methods known in the art. Pressure is not critical and atmospheric pressure, reduced pressure, or elevated pressure may be used. The product polymer may be recovered from the cooled polymer dope by addition to a nonsolvent liquid, i.e. a liquid which is not a solvent for the polymer, such as water or an alcohol, e.g. methanol, ethanol or propanol, optionally with a base, e.g. triethanolamine, diethanolamine, pyridine or ammonia. Accordingly, it is preferable to add the polymer dope slowly to the nonsolvent liquid to produce a finely divided solid product. The solid polyquinoline may then be washed and dried. The polymer may be further purified, if necessary, by re-dissolving and precipitating, by extraction or other methods known in the art. A continuous extraction over a period of about three days is presently preferred.

The base, if present, reacts with the acid catalyst and helps to extract the catalyst from the polymer. If it is desired to recover the catalyst, it is preferred not to use a base. This is because the base reacts with the acid catalyst to form a salt which is difficult to convert back to an acid. To recover the catalyst, the mixture of catalyst and nonsolvent may be heated to distill off the nonsolvent.

Alkyl phosphates suitable for use in the present invention have the general structure:

wherein $R_1$ is alkyl or aralkyl, such as alkyl of from 1 to 20 and preferably from 1 to 8 carbon atoms or aralkyl of from 7 to 24 and preferably from 7 to 11 carbon atoms, and $R_2$ and $R_3$ are independently H, alkyl, or aralkyl, such as alkyl of from 1 to 20 and preferably from 1 to 8 carbon atoms, or aralkyl of from 7 to 24 and preferably from 7 to 11 carbon atoms, and wherein at least one of $R_1$, $R_2$ and $R_3$ is alkyl or aralkyl. The alkyl phosphate is preferably monoalkyl phosphate ($R_1$ is alkyl or aralkyl, $R_2$ and $R_3$ are H) or dialkyl phosphate ($R_1$ and $R_2$ are independently alkyl or aralkyl, $R_3$ is H), more preferably monoalkyl phosphate ($R_1$ is alkyl, $R_2$ and $R_3$ are H) or dialkyl phosphate ($R_1$ and $R_2$ are alkyl and $R_3$ is H). Alternatively, the alkyl phosphate may be a mixture of monoalkyl phosphate ($R_1$ is alkyl or aralkyl, $R_2$ and $R_3$ are H) and dialkyl phosphate ($R_1$ and $R_2$ are independently alkyl or aralkyl, $R_3$ is H), preferably a mixture of monoalkyl phosphate ($R_1$ is alkyl, $R_2$ and $R_3$ are H) and dialkyl phosphate ($R_1$ and $R_2$ are alkyl and $R_3$ is H). Preferred mixtures contain 10% to 99% dialkyl phosphate, more preferably 20% to 90% dialkyl phosphate, and most preferably 30% to 90% dialkyl phosphate.

Mixed alkyl phosphates may be prepared from phosphoric acid, polyphosphoric acid, $P_2O_5$ and alcohols. Such preparations will have varying amounts of phosphoric acid and mono-, di-, and trialkyl phosphates. Accordingly, trialkyl phosphate and phosphoric acid may also be present in the mixture.

Examples of alkyl moieties useful in the present invention include, but are not limited to, methyl, ethyl, propyl, butyl, hexyl, octyl, and cyclohexyl. Butyl is presently preferred.

Examples of aralkyl moieties useful in the present invention include, but are not limited to, benzyl, 2-phenylethyl, 2-methylbenzyl, and (1-naphthyl)methyl.

Alkyl groups with three or more carbons may be single or mixed isomers. Examples of a single isomer include n-butyl, n-hexyl, and iso-propyl. Examples of mixed isomers are mixed n-butyl, iso-butyl, and tert-butyl; and mixed n-hexyl and 2-methylpentyl.

The presently preferred alkyl phosphate is butyl acid phosphate. This product is a mixture consisting primarily of mono- and dibutyl phosphate (also referred to as mono- and dibutyl acid phosphate or the mono- and dibutyl esters of phosphoric acid) wherein the phosphoric acid content is from 0 to 50% by weight, preferably 0 to 10% by weight, the trialkyl phosphate content is from 0 to 50% by weight, preferably 0 to 10% by weight and wherein the monoalkyl phosphate and dialkyl phosphate contents are from 20 to 80%, preferably 40 to 60% and more preferably 45 to 55% by weight. A commercially available butyl acid phosphate comprises 45 to 55% by weight n-butyl acid phosphate and 45 to 55% by weight di-n-butyl acid phosphate. This alkyl phosphate mixture is presently preferred due to its commercial availability and its relatively inexpensive cost.

The solvent is preferably any organic solvent that does not react with the monomers or the alkyl phosphate catalyst and does not dissolve the product polymer. Examples of solvents useful in the practice of the present invention include, but are not limited to, arenes such as benzene and toluene; alkylated benzenes such as xylene, mesitylene, and ethylbenzene; haloarenes such as chlorobenzene, amide solvents such as N,N-dimethylformamide, N,N-dimethylacetamide, N-methylpyrrolidinone, and N-cyclohexylpyrrolidinone; ethers such as tetrahydrofuran and dioxane; phenol and alkylated phenols such as cresol and tert-butylphenol; and sulfones such as diphenylsulfone. Preferably the solvent (or a component of the solvent) will have a boiling point between about 80° C. and 120° C. so that the rate of reaction is controlled by solvent reflux. More preferably the solvent will have a boiling point above about 90° C. so that the reaction may be run at atmospheric pressure.

Mixtures of solvents may be used. It is often advantageous to use a polar co-solvent such as cresol to aid in polymer solubility and to use a solvent or co-solvent which forms an azeotrope with water to aid in water removal during the polymerization. Preferably the azeotrope with water will have a boiling point between 80° C. and 120° C., and more preferably between 90° C. and 110° C. The pressure may be controlled to adjust the azeotrope temperature and thereby control the polymerization rate.

Known variations in the polymerization method, such as co-polymerization, monomer offset to control molecular weight, endcapping, use of tri- or multifunctional monomers to produce branched polymers or gels, and the like may be used in the practice of the present invention.

For example, endgroups may be incorporated into polyquinolines by methods known in the art, including the addition of endcappers to the polymerization reaction. For polyquinolines produced by Friedlander condensation, suitable endcappers are compounds containing either an aromatic ortho-amino carbonyl function or a methylene ketone function. Non-limiting examples of an ortho-amino carbonyl-containing endcappers are 2-aminobenzophenone, 2-amino-4-chlorobenzophenone, and 2-amino-4'-hydroxybenzophenone. Non-limiting examples of endcappers containing a methylene ketone function are acetophenone, deoxybenzoin, propiophenone, 4-hydroxyacetophenone, and 4-fluoroacetophenone. As is known to those of ordinary skill in the art, it is desirable to adjust the amounts of monomer(s) and optimally endcapper (s) using, for example, the Carothers equation as described in U.S. Pat. No. 5,017,677, or by empirical methods, to obtain polymer of the desired molecular weight (MW) and/or having most or essentially all of the chains terminated with endgroups.

U.S. Pat. No. 4,507,462 to Stille, which is incorporated herein by reference, discloses endcapped polyquinolines and methods for making the same. As disclosed therein, endcapped polyquinolines may be prepared by providing a molar excess of the o-amino ketone monomer as compared to the α-ketomethylene monomer during the Friedlander condensation polymerization reaction and thereafter adding a mono functional biphenylene compound as an endcapper. This process may be used with other suitable endcapping compounds, as disclosed above.

EXAMPLE 1

Preparation of Polyquinoline Polymer Using Butyl Acid Phosphate Catalyst

Polyquinoline polymer was prepared as described below according to the following chemical equation:

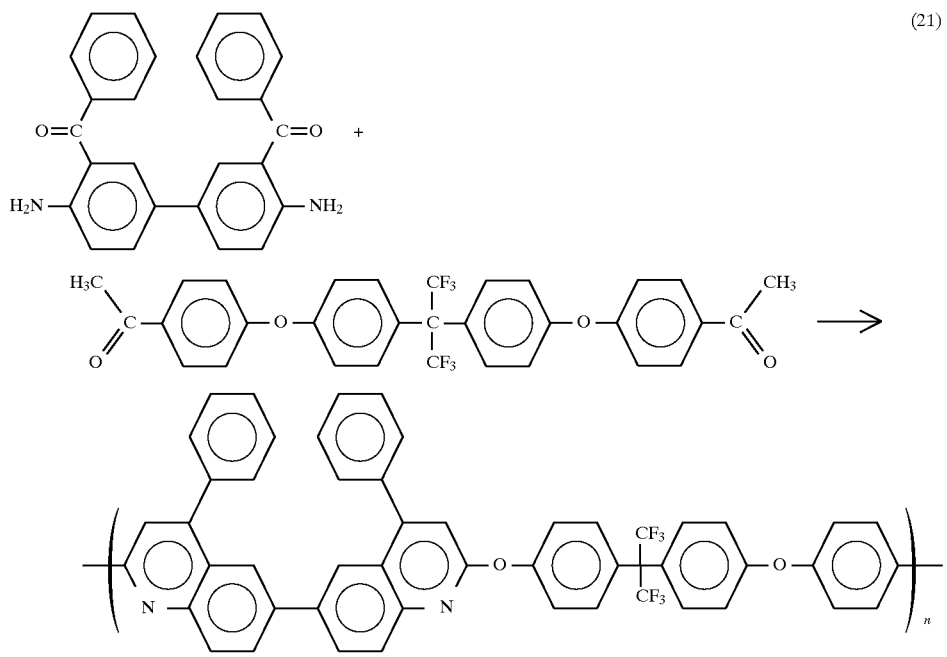

(21)

To a 3 L three neck round bottom flask was added 54.9414 g of 4,4'-diamino-3,3'-dibenzoylbiphenyl, 76.2543 g of 2,2'-bis[4-(4-acetylphenoxy)phenyl]hexafluoropropane, 509.96 g n-butyl acid phosphate (Johnson Matthey) and 500 ml toluene. The reaction mixture was purged with $N_2$ for 30 minutes. The temperature was then raised to 90° C. and the polymerization allowed to proceed at 90° C. for three days under $N_2$, with slow mechanical stirring. A reddish colored, homogeneous mixture was observed on the third day. The temperature was raised to 110° C. and, after five days, at 110° C., the hot reaction mixture was coagulated by pouring it into a solution of 10% triethylamine in anhydrous ethanol. The polymer solids were then extracted in a continuous extractor with 10% $Et_3N$/EtOH for three days. Size exclusion chromatography using polystyrene standards gave weight average MW=88,762; number average MW=43,829; and polydispersity index=2.025.

EXAMPLE 2

Preparation of Polyquinoline Polymer Using Butyl Acid Phosphate Catalyst

To a 12 L three neck round bottom flask was added 263.7188 g of 4,4'-diamino-3,3'-dibenzoylbiphenyl, 384.7037 g of 2,2'-bis[4-(4-acetylphenoxy)phenyl]hexafluoropropane, 2447.8 g n-butyl acid phosphate (Johnson Matthey), 1054 ml freshly distilled m-cresol; and 105.4 ml toluene. The reaction mixture was purged with $N_2$ and the temperature controlled at 108° C. for 9 hr, 115° C. for 8 hr, 100° C. for 15 hr, and 118° C. for 20 hr, with slow stirring during the entire reaction time. The reddish colored, homogeneous mixture was diluted with $CH_2Cl_2$ to 8% solids and coagulated by pouring it into a solution of 10% triethylamine in acetone. The polymer solids were then filtered and extracted in a continuous extractor with 10% $Et_3N$/acetone for three days and dried to yield 577 g of light yellow polymer, yield 91.2%. Size exclusion chromatography using polystyrene standards gave weight average MW=54,067; number average MW=28,526; and polydispersity index= 1.89.

EXAMPLE 3

Preparation of Polyquinoline Polymer Using Dihexyl Acid Phosphate Catalyst

To a 3 L three neck round bottom flask is added 54.9414 g of 4,4'-diaminobiphenyl, 76.2543 g of 2,2'-bis[4-(4-acetylphenoxy)phenyl]hexafluoropropane, 600 g n-hexyl acid phosphate and 500 ml toluene. The reaction mixture is purged with $N_2$ for 30 minutes. The temperature is then raised to 90° C. and the polymerization is allowed to proceed at 90° C. for 24 hours under $N_2$, with slow mechanical stirring. The temperature is then raised to 110° C. and after three days at 110° C. the reaction mixture is cooled to 60° C. and coagulated by pouring it into anhydrous ethanol. The polymer solids are then extracted in a continuous extractor with 10% by volume triethylamine in ethanol for three days. The polymer solids are then drained of solvent and dried under vacuum at 100° C. for 24 hours.

The above descriptions of preferred embodiments of catalysts and catalyst/solvent systems for use in preparing polyquinoline are for illustrative purposes. Because of variations which will be apparent to those skilled in the art, the present invention is not intended to be limited to the particular embodiments described above. The invention disclosed herein may suitably be practiced in the absence of any material or composition which is not specifically disclosed herein. The scope of the invention is described in the following claims.

What is claimed is:

1. A method for preparing a polyquinoline polymer comprising mixing together at least one monomer which, when polymerized, form a polyquinoline polymer, a solvent, and a catalyst comprising at least one alkyl phosphate.

2. The method of claim 1 wherein the alkyl phosphate has the structure

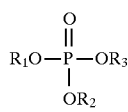

wherein $R_1$ is selected from the group consisting of alkyl, and aralkyl, and $R_2$ and $R_3$ are each independently is selected from the group consisting of H, alkyl and aralkyl.

3. The method of claim 1 wherein the catalyst comprises a mixture of two or more alkyl phosphates.

4. The method of claim 1 wherein the catalyst comprises dibutyl phosphate.

5. The method of claim 1 wherein the catalyst comprises a mixture of monobutyl phosphate and dibutyl acid phosphate.

6. The method of claim 1 wherein the solvent is selected from the group consisting of arenes, haloarenes, ethers, phenols, alkylated phenols, amides, sulfones and mixtures thereof.

7. The method of claim 6 wherein the solvent is selected from the group consisting of phenol and an alkylated phenol.

8. The method of claim 6 wherein the solvent comprises an arene.

9. The method of claim 4 wherein the solvent comprises toluene.

10. The method of claim 6 wherein the solvent comprises an amide.

11. The method of claim 6 wherein the solvent comprises a mixture selected from the group of an arene and a phenol or an arene and an alkylated phenol.

12. The method of claim 6 wherein the solvent comprises a mixture selected from the group of (a) an amide and a phenol, and (b) an amide and an alkylated phenol.

13. The method of claim 1 wherein the solvent has a boiling point of from about 80° C. to about 120° C.

14. The method of claim 13 wherein the solvent has a boiling point of at least about 90° C.

15. The method of claim 1 wherein the polyquinoline is a homopolymer.

16. The method of claim 1 wherein the polyquinoline polymer is a copolymer.

17. The method of claim 1 wherein the polyquinoline has a weight average molecular weight of at least about 1,000.

18. The method of claim 1 wherein the polyquinoline has a weight average molecular weight of at least about 5,000.

19. The method of claim 1 wherein the polyquinoline has a weight average molecular weight of at least about 10,000.

20. The method of claim 1 wherein the polyquinoline has a weight average molecular weight of at least about 50,000.

21. A method for preparing a polyquinoline polymer by Friedlander condensation polymerization comprising:
combining monomers which, when polymerized, form a polyquinoline polymer, a catalyst and a solvent, wherein the catalyst comprises at least one alkyl phosphate having the structure

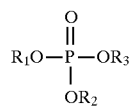

wherein $R_1$ is selected from the group consisting of alkyl and aralkyl and $R_2$ and $R_3$ are each independently selected from the group consisting of H, alkyl, and aralkyl;
heating the mixture to a temperature of from about 80° C. to about 120° C., for a time sufficient for at least a portion of the monomers to polymerize to form a polyquinoline polymer; and
separating the formed polyquinoline polymer from non-polymerized components of the mixture.

22. A method for preparing a polyquinoline polymer comprising mixing together an o-amino ketone monomer, a α-ketomethylene monomer, a solvent and a catalyst comprising an alkyl phosphate selected from the group consisting of mono-alkyl phosphates, dialkyl phosphates and mixtures thereof.

23. A method for preparing an endcapped polyquinoline polymer comprising mixing together an o-amino ketone monomer, a α-ketomethylene monomer, a solvent and a catalyst comprising an alkyl phosphate selected from the group consisting of monoalkylphosphates, dialkyl phosphates and mixtures thereof, wherein there is a molar excess of o-amino ketone monomer as compared to α-ketomethylene, and thereafter adding an endcapping compound having at least one of an aromatic ortho-amino carbonyl function and a methylene ketone function.

* * * * *